United States Patent [19]
Donges et al.

[11] Patent Number: 5,107,425
[45] Date of Patent: Apr. 21, 1992

[54] CONTROL SYSTEM FOR CONTROL DEVICES OF A MOTOR VEHICLE

[75] Inventors: Edmund Donges, Fürstenfeldbruck; Reinhard Auffhammer, Munich, both of Fed. Rep. of Germany

[73] Assignee: Bayerische Motoren Werke AG, Fed. Rep. of Germany

[21] Appl. No.: 385,188

[22] Filed: Jul. 26, 1989

[30] Foreign Application Priority Data

Jul. 26, 1988 [DE] Fed. Rep. of Germany ....... 3825280

[51] Int. Cl.$^5$ .............................................. G06F 11/08
[52] U.S. Cl. .......................... 364/424.03; 364/424.01; 371/68.1
[58] Field of Search ....................... 364/424.01, 424.03, 364/424.06, 434, 131, 133; 371/68.1

[56] References Cited

U.S. PATENT DOCUMENTS

| | | | |
|---|---|---|---|
| 4,032,757 | 6/1977 | Eccles | 371/68.1 |
| 4,130,241 | 12/1978 | Meredith et al. | 371/68.1 |
| 4,327,437 | 4/1982 | Gelderloos | 371/68.3 |
| 4,622,667 | 11/1986 | Yount | 364/434 X |
| 4,644,538 | 2/1987 | Cooper et al. | 371/9 |

Primary Examiner—Thomas G. Black
Attorney, Agent, or Firm—Evenson, Wands, Edwards, Lehahan & McKeown

[57] ABSTRACT

In the case of a control system for adjusting devices of a motor vehicle which, in addition to a basic mechanical function, carries out an additional function which can be achieved by electronic devices, having at least one sensor for an input value, one computer for converting the input value to an output value for a control element assigned to the additional function, and having an emergency device for an emergency measure in the case of an occurrence of a failure, the measures according to the invention are that a function chain consisting of the function step sensor(s), the computer(s) and an emergency device assigned to the control element, in contrast to the singly existing control element, have a redundant construction, that the elements of the function chains, which have the same effect, are monitored with respect to the same effect, and in that the emergency measure is triggered, when elements of the function chains which have the same effect exhibit a deviation by a given measurement.

12 Claims, 2 Drawing Sheets

FIG. 2

CONTROL SYSTEM FOR CONTROL DEVICES OF A MOTOR VEHICLE

BACKGROUND AND SUMMARY OF THE INVENTION

The present invention generally relates to a control system for adjusting devices of a motor vehicle which, in addition to a basic mechanical function, carry out an additional function which can be achieved by electronic devices, the control system having at least one sensor for receiving an input value which is provided to a computer for generating a control signal for controlling a control element assigned to the additional function, and more particularly to an arrangement and process for carrying out an emergency measure in the case of a failure during use of such a control system.

The control devices discussed in the following and which are contemplated for use with preferred embodiments of the present invention include rear-axle steering arrangements in addition to conventional front-axle steering arrangements, superimposed front-axle steering arrangements in addition to conventional front-axle steering arrangements, active roll stabilizing arrangements, active suspension arrangements, or so-called electronic gas pedal arrangements.

All control arrangements have in common that a basic mechanical function exists which, in the case of the rear-axle steering arrangement, represents the zero position of the rear wheels. In the case of the superimposed steering arrangement, the conventional front-axle steering position is the mechanical function. In the case of the roll stabilizing arrangement and the active suspension, the conventional mechanical suspension is the basic mechanical function And in the case of the electronic gas pedal, the initial position of an internal-combustion engine power control or regulating element is the basic mechanical function.

The emergency measure required to compensate for a failure of any control system will differ according to each application and/or severity of the failure. In the simplest case, it may consist of switching the control element to an ineffective state for the additional function or to arrest the control element in the position which immediately precedes the failure. To the extent that this is possible, the control element, in a controlled manner, may also be changed to a defined uncritical inoperative position. The failure, in turn, may be contained in one of the function chains forming the control system or in the control element itself.

In this field of technology, different solutions are known for recognizing an emergency and for triggering an emergency measure. Particularly, in the field of airplane construction, the so-called two-out-of-three redundancy exists for this purpose. This means that three function branches or function chains are set up which are independent from one another, and a failure of one function branch is recognized by the failure-free functioning of the other two function branches, and the faulty function branch is eliminated in this manner. Devices of this type cannot be used in motor vehicles for reasons of cost and installation space.

In the case of track-bound bus systems, two parallel function branches are known, of which each separately carries out the desired control function. If there is a failure in one function branch, this function branch is switched off, and only the other function branch continues to operate. A system of this type represents no increase of system reliability because, in the case of a failure, only one single function branch is available which will then operate in a completely "unprotected manner". A failure of the remaining function branch can then no longer be recognized and eliminated.

In the case of a use of such a system in motor vehicles, there is the additional problem that a complete doubling of the function branches results in the doubling of the control element for the additional function In the case of a failure, the control element of the faulty function branch may now block the function of the other control element. This circumstance also indicates that such a safety concept is not suitable for motor vehicles.

Accordingly, it is an object of the present invention to providing an electronic control system of the initially mentioned type which, with low expenditures, offers a maximum of functional reliability and which, specifically in the case of a failure, reliably causes the carrying-out of an emergency measure.

In addition, a further object of the present invention is to provide a process which, by means of using such a control system, in the case of a failure, initiates an emergency measure with an effect which is as advantageous as possible with respect to safety.

These and other objects are achieved by preferred embodiments of the present invention by providing the control system with substantially redundant function chains including operating elements arranged in a novel and unobvious manner, one function chain operating the control element of the additional function and the other function chain operating as a safety back-up without direct control of the control element. Each function chain is divided into separate sections or function steps, which carry out a particular function, such as sensing, signal processing, controlling or the like.

With the prerequisite of the basic mechanical function, the safety concept for the control system is shaped by the monitoring of identically operating elements of each function step of the function chains as well as the triggering of the emergency measure when, during this comparison, a failure of one of the two elements of a function step of a function chain is determined. These elements are one or several sensor(s) for providing the input values of the computer, the computer itself as well as an emergency device.

In addition, a processing or converting unit for the sensor signals, which may be connected at the output side of the sensors and is not discussed here, may be provided as well as amplifiers or the like connected to the output side of the computer. Each emergency device should separately be able to carry out a sufficient emergency measure.

In the case of the above-mentioned rear-axle steering arrangement, an emergency measure, in the case of a relatively minor failure, may consist of guiding the deflected rear wheels in a targeted manner and with finite speed back into the zero position. In the case of a severe failure of, for example, one of the computers or of the control element, it may be necessary to hold the rear wheels in the position which was adjusted last, i.e., immediately before the occurrence of the failure.

All emergency measures have in common that they either retain the just existing function condition or change it in a direction which increase safety. For the case of the rear axle steering arrangement, this means that the rear wheels, in the case of an emergency, remain in the present position, i.e., are held also in the deflected condition, or are led back to the central position, i.e., the deflection is eliminated.

In the case of the electronic gas pedal, the power adjusting element of the internal-combustion engine is held or is returned to the zero Position. In the case of the power adjusting element, this zero position is determined by the idling stop and, in the case of the rear-axle steering, is determined by the straight-ahead moving of the rear wheels and may also be reached by means of the basic mechanical function or within the scope of the basic mechanical function. For this purpose, simple spring elements may be provided, for example, which cause the adjusting of the basic function and against the effect of which the control element operates for the additional function. In the case of a failure, it may be provided as an emergency measure to disengage the control element and to carry out, by means of the mechanical spring elements, the adjustment of the basic mechanical function, in this case, the zero position of the adjusted part.

The monitoring of the individual elements of the function chains, in the case of the sensors supplying the input values, may take place at low expenditures by means of the computer connected on the output side of the sensors. For this purpose, the output signals of the sensors are supplied to each of the computers. These computers examine the output signals with respect to functional equality and are capable of determining a functional deviation of the output signals. In this case, the possibility also exists of identifying the faulty sensor and triggering a relatively careful emergency measure in that the control element is rendered ineffective at a finite speed.

The next element of the function chain, in the form of the computers, may advantageously be monitored by means of a communication device. This type of a device, in the simplest case, may be constructed as a data line or advantageously as a dual-port RAM. Each computer has a memory area there in which it can write and read itself and in which the respective other computer can read only.

It is another object of preferred embodiments of the present invention to insure the triggering of an emergency measure also if not only one failure occurs, but when a so-called double failure, i.e., two failures occur. In this case, these failures must be able to occur simultaneously, i.e., within one clock pulse at arbitrary points of the control system. By means of the step-by-step examining of the function chain with respect to the same function, the occurring of two failures at different steps is relatively uncritical because the emergency measure is already triggered by the failure of the step which is earlier in the signal sequence of the function chain.

However, a case is critical in which a failure occurs in one function step and particularly in the case of two elements which correspond functionally in a direct manner. It is theoretically possible that these failures are of the same type or lead in the same direction and can therefore not be recognized by a monitoring device. This problem is solved in that identically operating elements of the two function chains vary with respect to their method of operation and/or quality and/or quantity of their input or output signals.

The concrete significance of this is that, in the case of computers, the computer of each function chain, preferably, originates from different manufacturers and/or operate according to different algorithms and/or in a different fashion (for example, as 8-bit or 16-bit processors).

Equivalent sensors may vary in their output signals. If, for example, two sensors, i.e. one sensor for each function step, are provided for an angle of rotation, for example, of the steering wheel, the method of operation of the two sensors may differ with respect to its pulse quantity or its initial signal quality. The latter is, for example, achieved by the fact that one of the two sensors supplies a digital output signal and the other one supplies an analog output signal.

Output signals of a different polarity or different gradients, a different response behavior, a different mechanical transmission, different measuring principles, etc. should also be mentioned here.

In this manner, it becomes possible to achieve a maximum of reliability by means of microscopic variety, while macroscopically the function is the same, and to avoid with an almost certain probability the above-mentioned case of a malfunctioning in the same direction of two functionally identical elements of a corresponding function step.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic view of an example of the functional construction of a rear-axle steering arrangement of a motor vehicle according to one embodiment of the present invention.

DETAILED DESCRIPTION OF THE DRAWINGS

Figure 1:
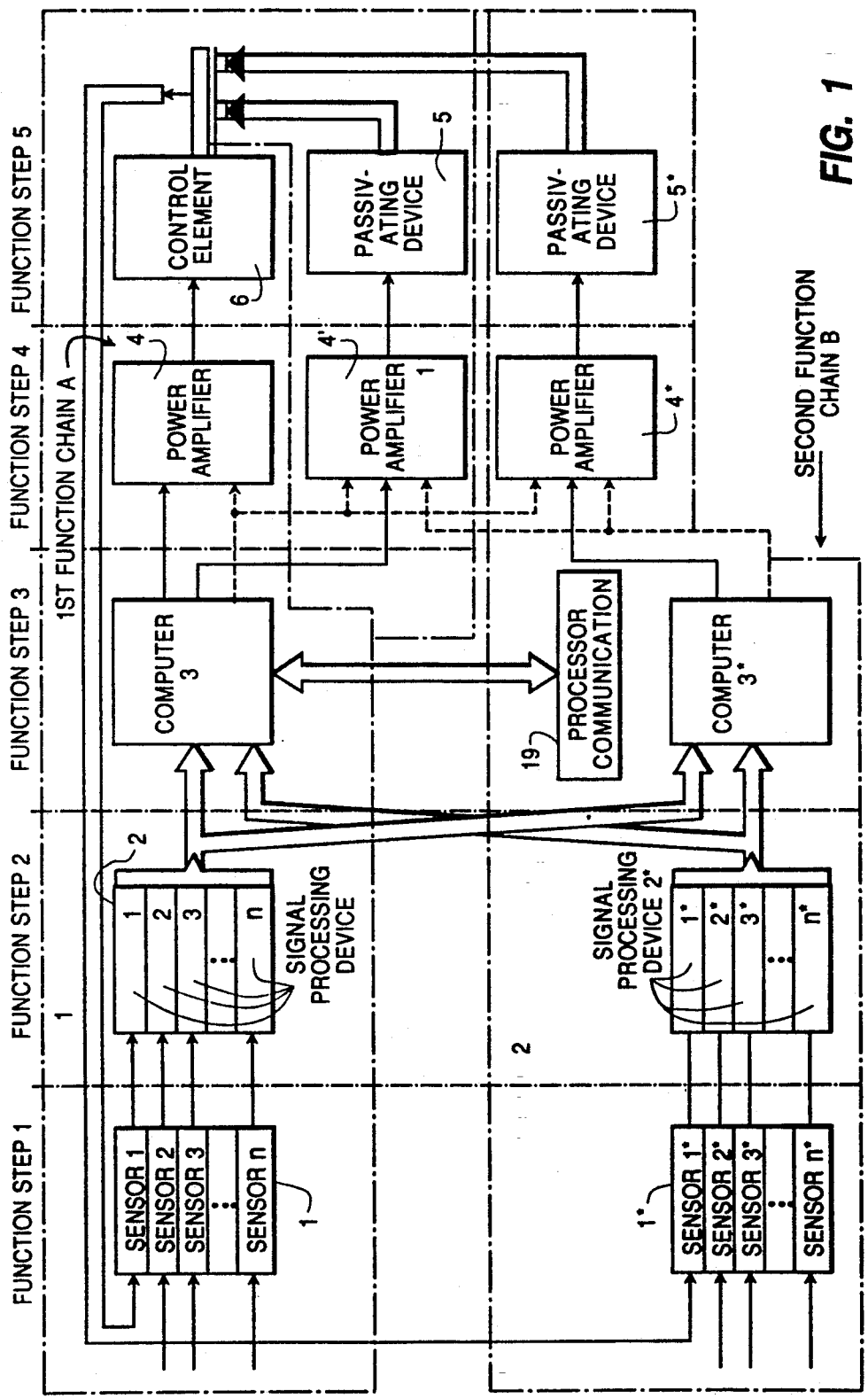
FIG. 1 is a view of the principal construction of a control system according to one embodiment of the invention.

The principal construction of a control system according to the invention for control devices of a motor vehicle shown in FIG. 1 comprises two parallel function chains, hereinafter referred to as first function chain A which is responsible for performing the control of a control element for carrying an additional function and second function chain B which is provided as a safety back-up and does not directly control the operation of the control element. Each of the function chains A and B executes five function steps which are referred to below as function step 1 to function step 5. Each of these function steps corresponds to a corresponding function step of the other function chain and is executed one or several elements.

In function step 1, each of the function chains A and B, is provided with a sensor or a plurality of sensors 1 and 1*, respectively. These sensors are for sensing physical Parameters or the like.

In function step 2, output signals from the sensors 1 and 1* are provided respectively to signal processing devices 2 and 2*. Each of the signal processing devices 2 and 2* is provided in one of the function chains A and B, respectively, and are respectively connected to an output side of one of the sensors 1 and 1* as shown in FIG. 1.

In function step 3, a computer 3,3* is provided respectively in each of the the function chains A and B for receiving output signals generated by the signal processing devices 2 and 2*, respectively. A communication device 19 can also be provided in function step 3 which connects the computers 3,3* of the function chains A and B and is provided to permit monitoring of the operation of the computer 3,3* by one another as will be described in more detail hereinafter.

In function step 4, each of the function chains is provided with a power amplifier 4,4*, respectively. Also included is a power amplifier 4' connected to a passivating device 5 of the function step 5 as described below.

In function step 5, passivating devices 5 and 5* are provided in each of the function chains A,B respectively, the passivating devices 5,5* being capable of inactivating a control device or element 6 or of moving the control element to a predetermined neutral position as will be described in more detail hereinafter.

As is apparent from the foregoing description, the symbol "*" indicates a redundant element with the same effect.

In addition, it should be made clear that the computer 3 controls the control element 6 by means of the power amplifier 4. The position of the control element 6 is processed by means of the sensors, i.e. sensors 1 or sensors 1* being employed as the sensor signal generators in function step 1.

The other basic traits of the functional construction are the result of the form of connecting and operating lines. For active conditions, in which signal is transmitted when the operation is failure-free, these connections are drawn by solid lines. The connections which are relevant to the emergency operation are drawn by interrupted lines. The result is that computer 3, in addition to acting on the power amplifier 4 and the control element 6, also acts upon power amplifier 4' and, thus also upon the passivating device 5, but not upon the power amplifier 4* and the passivating device 5* in the sense of an active signal transmission during normal operation of the system.

In the case of an emergency, however, computer 3 acts upon the power amplifier 4 and the control element 6 in the sense of carrying out an emergency measure and, in addition, in parallel, on the power amplifier 4' and the passivating device 5 as well as on the power amplifier 4* and the passivating device 5*. Computer 3, like computer 3*, is capable of activating both passivating devices 5 and 5* and thus simultaneously carrying out two emergency measures which, each separately, are sufficient, by means of the two passivating devices 5 and 5*.

Computer 3* is not capable of operating the power amplifier 4 and the control element 6. As a result, however, the second function chain B becomes operative completely as a monitoring device for the first function chain A. Only the first function chain A alone has the additional characteristic of activating the power amplifier 4 and the control element 6.

The principal components of the control system, in accordance with one embodiment of the present invention, are shown in detail in FIG. 2 and are indicated in parentheses in the pertaining description that follows below.

Figure 2:
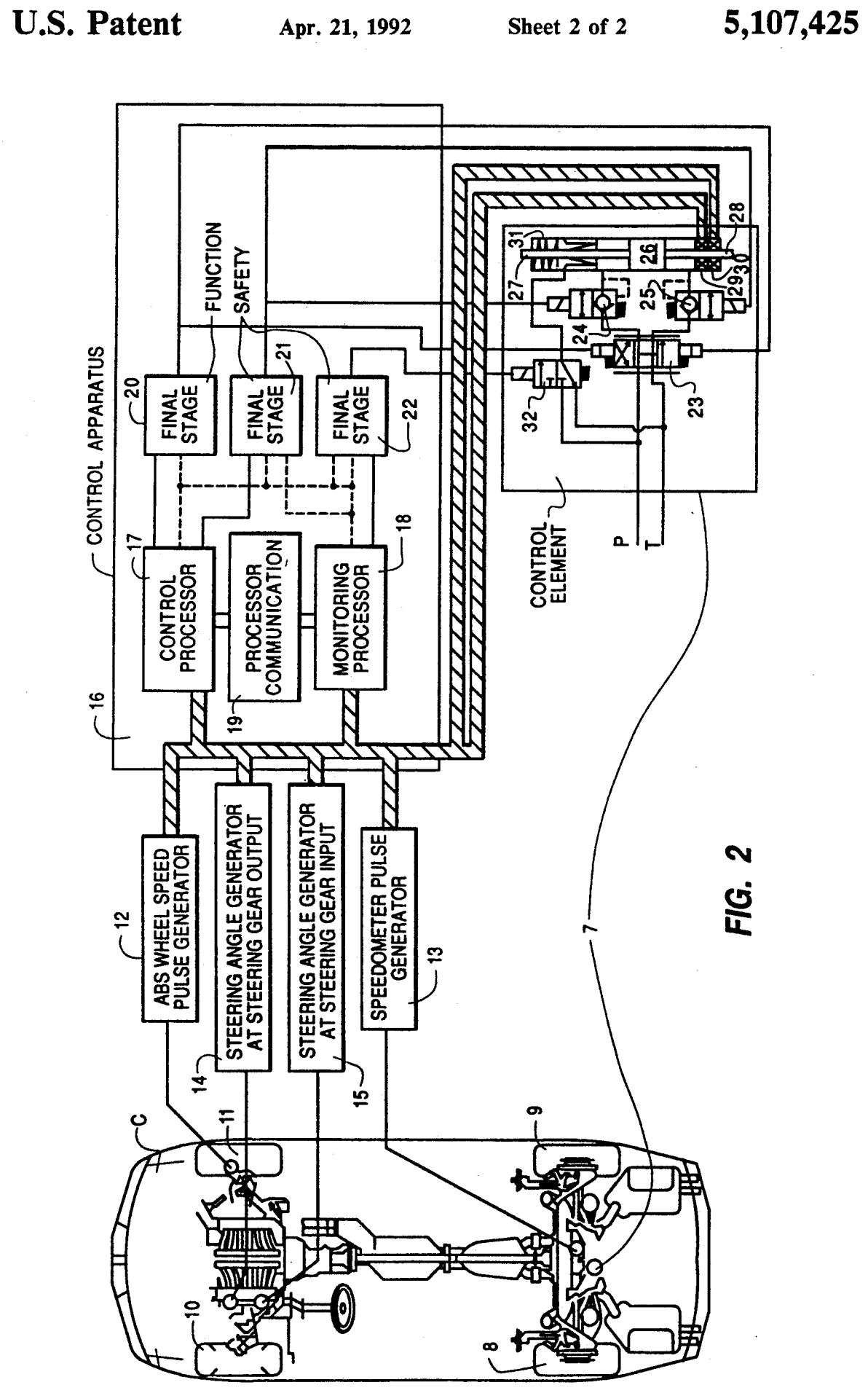

A motor vehicle C, shown in top view in FIG. 2, has a control device with a control element 7 (control element 6) for a rear axle with the rear wheels 8 and 9. By means of the control element 7, the steering angle of the rear wheels 8 and 9, starting from the basic function of straight-ahead driving set as a result of axle kinematics, is adjusted corresponding to the steering angle of the front wheels 10 and 11. The connection between the steering angles of the front wheels 10 and 11 and the rear wheels 8 and 9 may be selected corresponding to a dynamically advantageous algorithm for improving the handling of the vehicle and will not be discussed in the following description.

In addition, sensors for the vehicle speed in the form of an ABS wheel speed pulse generator 12 (sensors 2) are located at the front wheel 11, or in the form of a speedometer pulse generator 13 (sensors 2*), at the rear axle. Further steering angle generators for the front axle are provided in the form of a steering angle generator 14 (sensor 2) located at the steering gear output and in the form of a steering angle generator 15 (sensor 2*), located at the steering gear input.

A control apparatus 16 is connected to the output of the sensors 12 to 15 and includes not shown sensor processing devices, two computers 17 and 18 (computer 3/computer 3*), a communication device 19 as well as three final stages 20 to 22 (power amplifier 4/power amplifier 4'/power amplifier 4*).

The control apparatus 16 controls the control element 7 shown in detail in the lower right part of FIG. 2. It contains essentially a hydraulic proportional-action valve 23, return valves 24 and 25 connected down stream from this proportional-action valve 23, as well as an adjusting piston 26 which, starting from the shown center position, adjusts the steering angle of the rear wheels 8 and 9 by means of its piston rod 27 (not shown in detail).

Two sensors 29 and 30 (sensor 1 / sensor 1*) for the monitoring of the position of the piston 26 and thus of the steering angle of the rear wheels 8 and 9 are arranged at the piston rod 27 and are connected with the control apparatus 16. A mechanical clamping device 31 (passivating device 5) is also arranged at the piston rod 27 and, if required, fixes the piston rod 27 and thus holds the steering angle of the rear wheels 8 and 9. The clamping device 31 is controlled by means of a valve 32. In addition, a hydraulic clamping device (passivating device 5*) is implemented by means of the return valves 24 and 25. If required, both valves close off working spaces for the adjusting piston 26 which are connected to them and fix this adjusting piston 26 in its position.

The output signals of the two vehicle speed sensors 12 and 13, the two steering angle generators 14 and 15 and the two monitoring sensors 29 and 30 are also simultaneously fed to the computers 17 and 18. Each of the computers controls both final stages 21, 22 assigned to the emergency devices, in cases where an emergency measure must be initiated. The computer 17, in addition, controls the final stage 20 of the proportional-action valve 23. In this case, the final stage 20 acts upon the proportional-action valve 23 and guides it back into the center position, in which the proportional-action valve 23 is ineffective and only prevents the pressure existing in input pipe P coming from a hydraulic supply device which is not shown from acting on the control element. The final stage 21 acts upon the return valves 24 and 25 and no longer holds them open. Finally, the final stage 22, in this case, controls a valve 32, which is connected upstream of the clamping device 31, to control the operation of the clamping device 31.

In contrast, the computer 17 acts only on two final stages 20 and 21, and the computer 18 acts only on final stage 22 in a normal operating condition where the control element is to be activated. For this normal operating case, the proportional-action valve 23 is activated by the final stage 20, the return valves 24 and 25 are changed to the open position by final stage 21 and the valve 32 is opened by final stage 22 and, as a result, the clamping device 31 is rendered inoperative.

Sensors 12, 14 and 29 execute a function step in themselves, and sensors 13, 15 and 30 execute the function step which is parallel to it. The computer 17 executes the next function step, and the computer 18 executes the function step which is parallel to it. Final stages 21 and 22 execute the respective next function step, and the clamping device 31 or the return valves 24 and 25 execute the respective last function step. The result is that each functional element which functions one of the function steps is provided in a redundant manner.

The functionally equivalent elements which execute one function step are each tested separately. For sensors 12 and 13 as well as sensors 14 and 15, this takes place by means of the computer 17 and, independently, also by means of the computer 18. Possible failures in one of the sensors are recognized in this manner and have the effect that an emergency signal is caused which is explained further below. The computers 17 and 18, in turn, mutually monitor one another by means of a communication device 19 which may be constructed as a dual-port RAM. The method of operation of a communication device of this type which, in each case, has a memory area, in which one of the two computers can write into the memory and the other computer can only read the contents of the memory (applies to both computers), consists particularly of the fact that the computing sequences inside both computers 17 and 18 can be mutually monitored and faulty asynchronous conditions are recognized. Also in a case in which the two computers reach contradictory results, and an asynchronous method of operation of the two computers has no disturbing effect in this case, an emergency measure is triggered.

A failure of one of the final steps 20 to 22 is monitored by means of the monitoring sensors 29 and 30 and also results in the triggering of an emergency signal. This also applies to a breakdown of one of the two monitoring sensors 29 or 30.

Finally, it is provided that the emergency signal is triggered or an emergency measure is taken in the case of a total failure of the electric system or of the hydraulic system. In the case of the electric system, the valves 32, 24 and 25, which are constructed as, for example, electromagnetic valves, close under the effect of springs and have the result that the effect of the hYdraulic system on the adjusting piston 26 is cancelled and by means of the valve 32, which then moves into the lower one of the two drawn conditions, the clamping device 31 becomes operative and holds the piston rod 27 in a fixed position.

Correspondingly, in the case of a total breakdown of the hydraulic system, in which the input line P is depressurized, the clamping device 31 will automatically change to the operative condition, in which it stops the piston rod 27. This is achieved by the method of operation of the clamping device 31 which releases the piston rod 27 only if a pressure exists in line P which differs from zero and when the switching valve 32 is located in the upper position.

In this manner, it is possible to recognize a simple failure, such as the failure in one of the existing elements and trigger a corresponding emergency measure. Corresponding to the type of the recognized failure, this emergency measure may consist of an immediate adjusting of the clamping device 31 in the operative position (as, for example, in the case of a total breakdown of the electrical sYstem); or it may consist of a controlled transition into the inoperative position in which the adjusting piston 26 takes up its central position, and thus the steering angle of the rear wheels 8 and 9 is equal to zero. This may be achieved by the corresponding control by means of the proportional-action valve 23.

The characteristic of also achieving an effective protection with respect to double failures is of special significance. If two failures are considered first which are located in elements which execute different function steps, because of the failure which is first with respect to the signal flow, a triggering of the emergency measure is obtained. The occurrence of the failure which is second in the signal flow, will then no longer have any effect.

A critical case exists if two elements, which have the same effect, fail in two parallel function steps. This type of a condition, which is relatively improbable anyhow, is covered in the case of the invention by the fact that identically acting or equivalent elements of one function step do not have an identical construction. This is demonstrated, for example, in the form of the vehicle speed sensor in which, although the sensors 12 and 13 permit an obtaining of information concerning the vehicle speed, they are applied to a different part (front wheel 11 or rear-axle gear). In addition, the sensors 12 and 13, relative to the same vehicle speed, in a normal case, supply a varying number of pulses. Any deviation from this indication can be recognized easily by means of the computers 17 and 18.

The same is true for the sensor of the steering angle generator in the form of sensors 14 and 15. These are also located at different points and, relative to the steering angle, furnish a quantitatively different output signal.

Another critical failure condition is the failure of the proportional-action valve 23 or of the assigned final stage 20 because this failure may result in a fast excursion of the piston rod 27. If one or both computers 17 or 18, by means of the monitoring sensors 29 and/or 30, determine that the position of the piston rod deviates unacceptably far from the desired position, this undesired movement is prevented by means of the passivating devices.

Since it is possible, in principle, that the second failure for the double-failure consideration concerns the passivating devices, these are designed double in order to be able to, also in this case, change the system securely over to the passive state.

For example, despite a failure of one or both return valves 24 and/or 25 or of the assigned final step 21, by means of the clamping device 31, the system can be changed over to the secure position (i.e., passive basic function).

Similarly, it is possible when, as the second failure, the clamping device 31 or the assigned final step 22 fails, to bring the system into the secured position by means of the return valves 24 and 25.

A possible failure of the two passivating devices in the same direction is avoided with reasonable probability by means of the constructively different designs of the two passivating devices (return valves and mechanical clamping device).

If both monitoring sensors 29 and 30 fail at the same time or both, simultaneously, exhibit a faulty behavior, a critical case can also be avoided This is achieved by means of the different method of operation or by the different construction of the two sensors 29 and 30. For example, the sensors may each supply an analog or a digital output signal or differ in their polarity or the slope of their characteristics curves. A failure of both sensors can therefore not have an effect in the same direction and can therefore be recognized clearly by means of computers 17 and 18.

As a possible worst case, there remains the case in which the hydraulic system and the electrical system fail completely. Even then, the method of operation of the clamping device 31 and of the return valves 24 and 25, against a mechanical spring, provides that the clamping device 31 will respond in such a case (corresponds to the previously mentioned case of the total failure of the hydraulic system alone), and the adjusting piston 26 is fixed.

In this manner, reliability is also achieved with respect to double failures. As a result, a maximum of safety is ensured also in the case of function units which are critical with respect to safety, such as a steerable rear axle, a superimposed steering for the front axle, etc.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A control system for adjusting devices of a motor vehicle which, in addition to a basic mechanical function, carries out an additional function which is achieved by electronic means, the control system comprising:
    a first function chain constructed from a plurality of elements which execute a plurality of function steps, the elements including sensors for executing a sensor function step and providing a sensor output signal representative of a sensed physical parameter, computer means for executing a computing function step for converting the sensor output signal to a control signal for controlling a control element assigned to the additional function, and an emergency means for executing an emergency function step for providing an emergency measure in the case of a failure of the control system; and
    a second function chain including elements corresponding to the elements of the first function chain in a redundant manner with the exception of the control element, wherein corresponding elements produce corresponding outputs based on corresponding inputs;
    wherein the computer means of the first and second function chains mutually monitor element of each of the function chains; and
    wherein the emergency measure is triggered when elements of the first and second function chains, which normally produce the same output, exhibit deviation by a given amount.

2. A control system according to claim 1, wherein the output signals of the sensors are fed to both computer means simultaneously.

3. A control system according to claim 1 further comprising communication means for permitting the computer means of the first and second function chains to monitor the operation of each other.

4. A control system according to claim 1, wherein additional function steps are provided in the first and second function chains, these additional function steps, with respect to their effect, corresponding with function steps of the respective other function chain.

5. A control system according to claim 1, wherein the elements of the first and second function chains which have the same effect differ with respect to their method of operation.

6. A method for carrying out an emergency measure in a control system which, in addition to a basic mechanical function, carries out an additional function which is achieved by electronic means comprising the steps of:
    forming first and second function chains having a plurality of elements which execute function steps, the first function chain controlling a control element and the second function chain including elements for executing each function step of the first function chain corresponding to the elements of the first function chain in a redundant manner with the exception of the control of the control element, wherein corresponding elements produce corresponding outputs based on corresponding inputs;
    mutually monitoring the elements of each of the first and second function chains; and
    triggering an emergency measure when element of either of the first and second function chains, which normally produce the same output, exhibit a deviation by a given amount.

7. A method according to claim 6, wherein the step of triggering an emergency measure is selected differently depending on the type of deviation.

8. A control system for a device of a motor vehicle, the device having a plurality of operating states including a neutral state, the system comprising:
    a first function chain including (a) a first sensor having an output for providing a first sensor signal representative of a sensed parameter of operation of the vehicle, (b) a first computer having an output for outputting control signals, (c) a control element connected to operate the device responsive to a first control signal from the first computer, and (d) a first passivating device connected to control the device into the neutral state responsive to a second control signal;
    a second function chain including (a) a second sensor having an output for providing a second sensor signal representative of said sensed parameter of operation of the vehicle, (b) a second computer having an output for outputting control signals, and (c) a second passivating device connected to put the device into the neutral state responsive to a third control signal; and
    a communication device connected between the first and second computers for permitting the first and second computers mutually to monitor one another;
    wherein the first computer is directly coupled to the first and second sensors and the second computer is directly coupled to the first and second sensors such that the first and second computers both receive the first and second sensor signals from each of the first and second sensors for detecting a deviation between the sensor signals, and to output the second and third control signals to the passivating devices responsive to a deviation or to a contradictory result between the first and second computers.

9. A control system according to claim 8, wherein corresponding elements of the first and second function chains differ with respect to their methods of operation.

10. A control system for a device of a motor vehicle, the device having a plurality of operating states including a neutral state, the system comprising:
- a first function chain including (a) a first sensor having an output for providing a first sensor signal representative of a sensed parameter of operation of the vehicle, (b) a first computer having an output for outputting control signals, (c) a control element connected to operate the device responsive to a first control signal from the first computer, and (d) a first passivating device connected to control the device into the neutral state responsive to a second control signal; and
- a second function chain including (a) a second sensor having an output for providing a second sensor signal representative of said sensed parameter of operation of the vehicle, (b) a second computer having an output for outputting control signals, and (c) a second passivating device connected to put the device into the neutral state responsive to a third control signal; and
- wherein the first computer is directly coupled to the first and second sensors and the second computer is directly coupled to the firs and second sensors such that the first and second computers both receive the first and second sensor signals from each of the first and second sensors for detecting a deviation between the sensor signals, and to output the second and third control signals to the passivating devices responsive to a deviation.

11. A control system according to claim 10, wherein corresponding elements of the first and second function chains differ with respect to their methods of operation.

12. A method for carrying out an emergency measure in a control system which, in addition to a basic mechanical function, carries out an additional function which is achieved by electronic means, the method comprising the steps of:
- forming a first function chain including (a) a first sensor having an output for providing a first sensor signal representative of a sensed parameter of operation of the vehicle, (b) a first computer having an output for outputting control signals, (c) a control element connected to operate the device responsive to a first control signal from the first computer, and (d) a first passivating device connected to control the device into the neutral state responsive to a second control signal;
- forming a second function chain including (a) a second sensor having an output for providing a second sensor signal representative of said sensed parameter of operation of the vehicle, (b) a second computer having an output for outputting control signals, and (c) a second passivating device connected to put the device into the neutral state responsive to a third control signal;
- providing the first and second sensor signals to the first computer through direct coupling and providing the second sensor signals to the first and second computers through direct coupling for detecting a deviation between between the sensor signals; and
- providing the second and third control signals to the passivating devices responsive to a deviation.

* * * * *